United States Patent Office 3,248,650
Patented Apr. 26, 1966

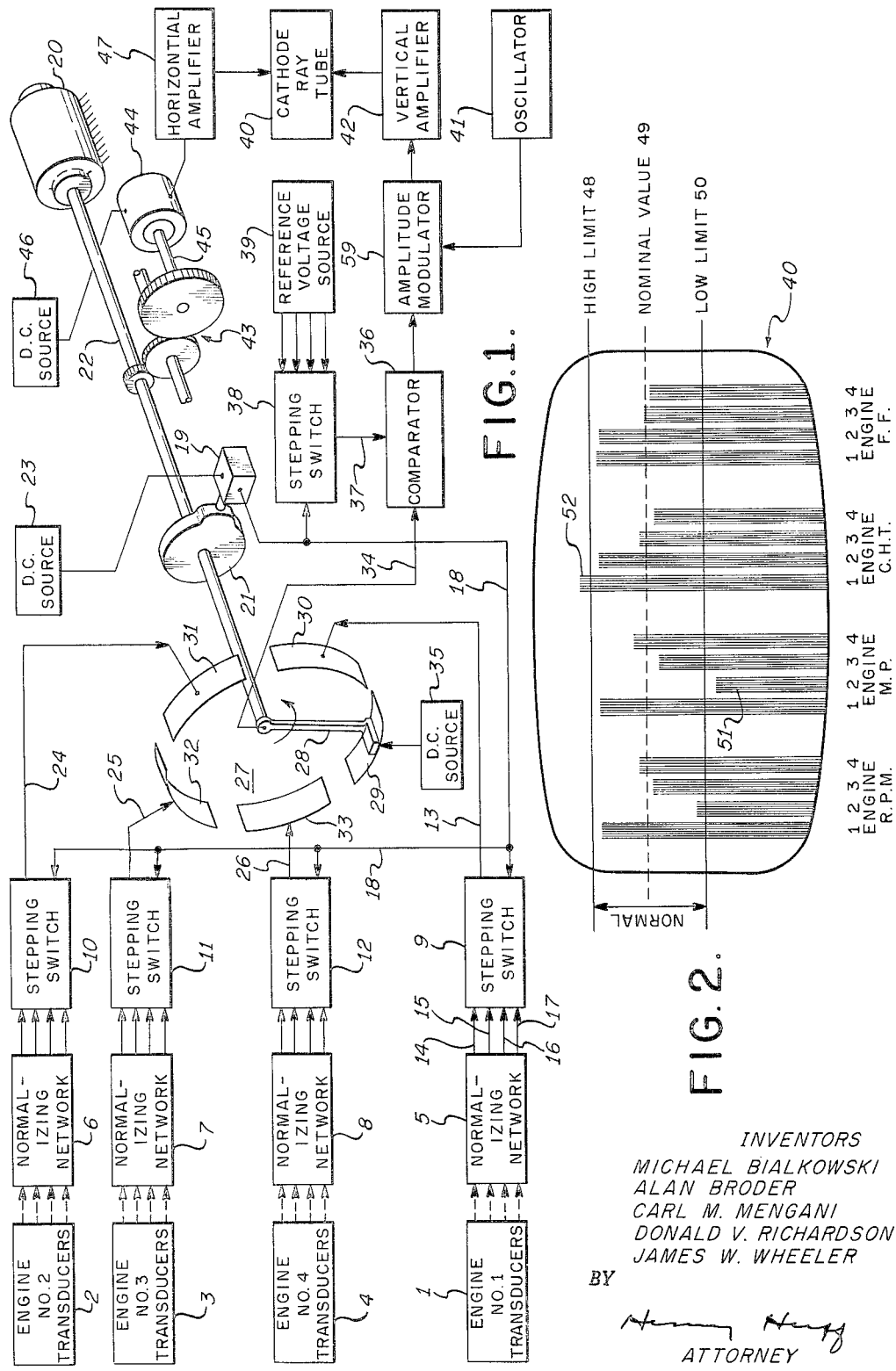

3,248,650
CATHODE RAY TUBE INDICATOR FOR DISPLAYING PLURAL INPUT SIGNAL VALUES
Michael Bialkowski, Tucson, Ariz., Alan Broder, Glen Oaks, and Carl M. Mengani, Brooklyn, N.Y., Donald V. Richardson, Stratford, Conn., and James W. Wheeler, Seacliff, N.Y., assignors to Sperry Rand Corporation, Great Neck, N.Y., a corporation of Delaware
Filed Apr. 19, 1961, Ser. No. 104,168
6 Claims. (Cl. 324—121)

The present invention generally relates to cathode ray indicators and, more particularly, to a cathode ray indicator system adapted for the bar graph in-line display of specially selected and arranged groups of normalized data representing, for example, multiple engine aircraft performance.

A problem of ever-increasing magnitude is the centralized surveillance of a complex system. As the number of the operating parameters to be monitored increases, it becomes impractical to provide individual meters and indicators for the display of the respective data. It is now recognized that it is not only preferred, but necessary, that the multiplicity of data to be monitored be presented in a concise, intuitively understandable and maximally useful manner so as to quickly provide a human operator with all the available data.

The trend of aircraft development, for example, has required that an increasing number of complex instruments be installed in confined spaces. Concomitantly, the skill and effort required of the pilot to adequately interpret the information intrinsically available from these instruments is also increased. This problem is met, in accordance with the present invention, by the provision of a cathode ray tube data indicator system which presents all normally instrumented aircraft performance data in a single instrument. More particularly, the data is specially arranged in easily scannable groups having interrelated significance whereby more information is available from the grouped data than the mere sum of the individual data. Each of the individual data is processed to represent deviation from a respective nominal value. The data is presented in the form of a bar graph producing a levelized in-line display when all of the monitored parameters are at their respective nominal values. Each of the displayed information is normalized so that common maximum and minimum tolerable limits apply.

A preferred presentation is one which informs the human operator immediately whether the value of any one parameter under surveillance is normal or beyond acceptable limiting values. The best presentation is one which permits the operator to scan the data pattern rapidly and quickly discern not only that all parameter values are within normal acceptable deviations from nominal values but also whether an incipiently unacceptable or dangerous situation is developing. The latter determination can be made by noting the sense and magnitude of the deviations of related parameter values from their respective nominal values.

It is the principal object of the present invention to provide a rapidly scannable, easily interpretable display of monitored parameter values in terms of their deviations, if any, from respective nominal values.

Another object is to provide a display of the values of normalized data in terms of common maximum and minimum acceptable limits.

A further object is to provide for the presentation of a multiplicity of normalized data on a cathode ray indicator producing a bar graph in-line visual pattern when each of the normalized data assumes a respective nominal value.

Another object is to provide for the display of a multiplicity of normalized system data arranged in predetermined groups of interrelated significance whereby the grouped data conveys information respecting over-all system performance.

These and other objects of the present invention, as will appear from a reading of the following specification, are accomplished in an illustrative embodiment by the provision of a cathode ray tube indicator system for the display of the values of operational parameters of a multiple engine aircraft. Each engine is fitted with a plurality of transducers for measuring respective operating parameters such as engine r.p.m., manifold pressure, cylinder head temperature and fuel flow. The electrical signal produced by each of the transducers is normalized so that the same voltage increment represents maximum acceptable deviation of each of the monitored parameter values from its respective nominal value. The normalized data signals are applied in time succession to a common transmission channel wherein each of the normalized signals is compared in said time succession with a respective reference signal representing the nominal value of the normalized signal.

A sequence of error signals is produced at the output of the comparator, each error signal representing the deviation, if any, of a particular normalized signal from its corresponding nominal value. The sequential error signals are then applied to the vertical deflection plates of a suitably synchronized cathode ray tube to produce an in-line bar graph visual pattern. High and low limit horizontal lines are provided on the face of the cathode ray tube. The same high limit and the same low limit lines apply commonly to all of the displayed normalized data. The high limit line represents the maximum tolerable value of all parameters and the low limit line represents the minimum tolerable value of all parameters, normal value being anywhere between the two lines with nominal value being midway between.

For a more complete understanding of the present invention, reference should be had to the following specification and to the drawings of which:

FIG. 1 is a simplified block diagram, partially schematic in presentation, of an illustrative embodiment of the present invention adapted for the display of aircraft performance data; and FIG. 2 is a diagram of a representative data display produced on the indicator of FIG. 1.

Referring to FIG. 1, each aircraft engine is provided with a multiplicity of conventional transducers for measuring the customarily instrumented engine data such as engine r.p.m., manifold pressure, cylinder head temperature and fuel flow. The transducer associated with the respective aircraft engines are represented by the blocks 1, 2, 3, and 4. It is preferred, although not necessary, that each transducer be linearly responsive to variations in the parameter value being measured within the range of anticipated parameter value excursion. In a typical case, a transducer producing angular displacement of a shaft proportional to the monitored parameter value may be employed. For any one parameter, there will exist a predetermined angular displacement of the transducer shaft which represents a range of normal diviations of the monitored parameter value from a predetermined nominal value. For example, an angular increment of 5° might represents a normal range of engine r.p.m. for a particular flight condition. On the other hand, an angular increment of, say, 30° might represent a tolerable range of cylinder head temperature values for the same engine under the same flight condition.

The different angular increments representing normal variations of respective monitored parameter values are processed in the respective normalizing networks 5, 6, 7 and 8 to which engine transducers 1, 2, 3 and 4 are connected. The purpose of the normalizing networks is to convert the transducer signals into proportional electrical signals each of which represents the normal range of a respective parameter value by the same convenient signal increment. In terms of the illustrative transducer producing angular shaft displacements, each transducer shaft may be connected to the wiper arm of a respective potentiometer which is excited by an appropriate direct voltage. The amplitude of each excitation voltage is selected so that the voltage at the corresponding potentiometer wiper varies through the same increment in response to transducer shaft displacements representing normal parameter value deviations. Assuming, for example, that four transducer are associated with each of engines 1, 2, 3 and 4 and that each transducer produces a respective shaft angular displacement, each of normalizing networks 5, 6, 7 and 8 may be provided with four potentiometers. Each potentiometer wiper is driven by a respective transducer shaft. Each potentiometer is excited by a predetermined direct voltage having an amplitude determined as described above.

The four normalized signals at the output of networks 5, 6, 7 and 8 are applied to a respective one of stepping switches 9, 10, 11 and 12. In a typical case, each stepping switch may consist of a relay actuated single pole multiple throw switch having a wiper arm that connects with successive ones of stationary contacts in response to successive actuations of the relay. The purpose of each stepping switch is to produce in predetermined time succession on a single output line such as line 13 the normalized data signals appearing on the input lines 14, 15, 16 and 17. Each of the stepping switches 9, 10, 11 and 12 are successively actuated or stepped in unison by a common actuating signal appearing on line 18 at the output of cam driven switch 19.

Switch 19 is actuated by drive motor 20 which rotates at some relatively constant convenient speed. It is not necessary that the rotational speed of motor 20 be closely controlled. Cam 21 is arranged to close the contacts of switch 19 once per revolution of shaft 22 of motor 20. Switch 19 is energized by D.C. source 23 to produce a voltage pulse on line 18 upon the occurrence of each closure of the contacts of the switch 19. Each voltage pulse on line 18 advances by one contact position the movable contacting member of each of switches 9, 10, 11 and 12 in unison.

Each of the lines 13, 24, 25 and 26 of switches 9, 10, 11 and 12 is connected to respective stationary contact of commutator 27. It is assumed that means are provided (not shown) for initially setting the positions of the movable contacting members of switches 9, 10, 11 and 12 so that at any given time each movable member selects a corresponding normalized data signal. For example, when initially set, normalized data signals representing the engine r.p.m. of respective ones of engines 1, 2, 3 and 4 are simultaneously applied to the respective stationary contacts of commutator 27. As each of the switches is stepped in response to successive pulses on line 18, a different set of normalized data signals is selected and simultaneously applied to the stationary contacts of commutator 27.

Wiper 28 of commutator 27 is driven by shaft 22 in synchronism with cam 21. Thus, wiper 28 successively contacts each of five stationary members 29, 30, 31, 32 and 33 between successive closures of switch 19. It will now be seen that for any given actuation of switches 9, 10, 11 and 12, normalized data signals representing the corresponding parameter of each of engines 1, 2, 3 and 4 will be sampled in succession by rotating wiper 28. Thus, there is produced on output line 34 of wiper 28 a succession of pulsed signals having amplitudes representing the sequentially sampled data signals.

It should be noted that stationary member 29 of commutator 27 receives a D.C. voltage produced by source 35. It does not receive any transducer generated data signals. The purpose of member 29, as will be seen more fully later, is to distinguishably separate each group of four sampled data signals generated upon a given revolution of shaft 22. Each of the four sampled data signals comprising a group occur in close succession. The successive groups of sampled data signals are separated by longer intervals than those between the individual sampled data signals.

The grouped data signals on line 34 are applied to a first input of comparator 36. The second signal input to comparator 36 is derived from the output line 37 of stepping switch 38 which may be identical to stepping switches 9, 10, 11 and 12 and is driven synchronously therewith in response to the actuating pulses of line 18. A plurality of reference voltages is generated by source 39 and applied to switch 38. The amplitude of each reference voltage represents the nominal value of a respective one of the four parameters being monitored by each set of engine transducers. Inasmuch as switch 38 is stepped in synchronism with switches 9, 10, 11 and 12, a single reference voltage is applied to comparator 36 during the time that the output lines 13, 24, 25 and 26 are successively sampled by commutator 27.

For example, a reference voltage representing the nominal value of engine r.p.m. for a predetermined flight condition is selected by switch 38 and applied to a first input of comparator 36 continuously during the time that the normalized r.p.m. data signals from corresponding transducers of the four engines are applied in sequence to the second input of comparator 36. If each of the sampled data signals represents the aforesaid nominal value, then a succession of pulses having the same amplitude is produced at the output of comparator 36. If any of the sampled data signals has a value other than the nominal value, then a sequence of pulses of nonequal amplitude is produced. The pulses are then applied to a first input of amplitude modulator 59.

The purpose of modulator 59 is to "fill in" and thus visually intensify the individual bar-like deflections on the face of cathode ray tube 40 as shown in FIG. 2. Oscillator 41 provides a high frequency carrier signal which is amplitude modulated in modulator 59 by the sequence of pulses at the output of comparator 36. The resulting pulse modulated carrier signal is amplified in vertical deflection amplifier 42 and applied to the vertical deflection means of cathode ray tube 40.

Shaft 22 of motor 20 is connected via stepdown gearing 43 to rotatable potentiometer 44. In terms of the disclosed embodiment, wherein four complete rotations of shaft 22 are required to complete the sampling of all four transducer signals from all four engines (a total of 16 signals), gearing 43 is arranged to turn shaft 45 at one-fourth the angular rate of shaft 22. Shaft 45 is connected to position the wiper of potentiometer 44. Potentiometer 44 is energized by a suitable direct voltage generated by source 46. Assuming the constant rotation of shaft 22, there is produced at the slider of potentiometer 44 a recurrent series of substantially linear sawtooth voltages. The duration of each sawtooth is the same as the time required to complete one sampling cycle of all the normalized data signals. The sawtooth signals are applied by horizontal deflection amplifier 47 to the horizontal deflection means of cathode ray tube 40.

FIG. 2 represents a typical data display produced on the face of cathode ray tube 40 by the apparatus of FIG. 1. It will be noted that each group of four bar-like deflections is designated by a corresponding legend such as RPM, MP, CHT, and FF. Provision may be made for the display of any other selected group of parameter values. Each bar deflection is visibly separated from its adjacent bar deflection in a given group due to the action of wiper 28 of commutator 27 in passing over the gaps separating adjacent ones of the stationary contacting members 29, 30, 31, 32 and 33. During the time that wiper 28 is between adjacent stationary contacting members, only the reference voltage selected by switch 38 is applied to comparator 36. The reference voltage, when applied alone to comparator 36, causes the beam of cathode ray tube 40 to be deflected downwardly off the face of the tube.

The extended separation between the adjacent groups of bar-like deflections is produced during the time that wiper 28 contacts stationary member 29 which is connected to D.C. source 35. The polarity of the voltage generated by source 35 is chosen to produce a downward deflection of the beam of tube 40 to cause the trace to move off the face of the tube whether or not a reference voltage is also applied by switch 38 to comparator 36. It will be noted that the reference voltage is switched at a point during the time that wiper 28 of commutator 27 is in contact with stationary member 29.

A series of horizontal fiducial lines 48, 49 and 50 are placed across the face of tube 40. Line 48 indicates the maximum tolerable upward deviation of any of the monitored parameters from a predetermined nominal value. Line 49 indicates the nominal values of the monitored parameters whereas line 50 designates the maximum tolerable downward deviation of the parameter values from the nominal value. In the typical presentation of FIG. 2, all but two of the individual parameter indications are within a normal or acceptable deviation range from their nominal values, i.e., all but two of the indications lie between lines 48 and 50. The individual indication 51 which lies below line 50 indicates that the manifold pressure of engine number 2 has fallen below normal whereas the individual indication 52 shows that the cylinder head temperature of engine number 1 has risen above normal.

It will be observed that not only are abnormalities of individual parameter values readily discernible but additional engine performance data are also clearly implicit. For example, the indicated r.p.m., manifold pressure and fuel flow of engine No. 1 are all high although within normal limits. The cylinder head temperature of engine No. 1, however, is slightly higher than the acceptable value denoted by line 48. This would tend to indicate that the abnormal cylinder head temperature may be corrected simply by reducing the fuel flow or throttling back on engine No. 1. It would be expected that such corrective action would simultaneously reduce all four parameter values toward the predetermined nominal value represented by line 49.

The representative display of FIG. 2 also indicates that the manifold pressure of engine No. 2 is below the acceptable limiting value designated by line 50. The r.p.m. of engine No. 2 is also low but still in the normal range whereas both the cylinder head temperature and fuel flow of engine No. 2 are relatively high in the normal range. This would indicate that the abnormally low manifold pressure of engine No. 2 probably would be corrected by reducing the pitch of the engine No. 2 propeller. Such a reduction in propeller pitch should simultaneously increase both the r.p.m. and manifold pressure of engine No. 2. After the r.p.m. and manifold pressure have increased following a reduction in propeller pitch, it might be that a decrease in the fuel flow associated with engine No. 2 would also be warranted in order that the indicated high fuel flow and cylinder head temperatures of engine No. 2 might be restored to the nominal value represented by line 49.

In both the above illustrative examples not only were abnormalities of the parameter values quickly discernible but the probable causes thereof and the corrective action to be taken were also made apparent. The diagnosed corrective action is based upon the interdependence between the displayed parameters wherein manifold pressure and r.p.m. of a given engine tend to vary together in the same sense. Fuel flow and cylinder head temperature of a given engine also tend to vary together in the same sense. As is well understood, all four parameters tend to vary in the same sense for a given engine of the pitch of the engine propeller is not varied.

Although the preferred embodiment of the present invention has been described in connection with the monitoring of parameters associated with a multiple reciprocating engine aircraft, it will be seen that the invention is readily adaptable to the monitoring of analogous jet engine aircraft parameters. More generally, the invention may be employed with particular advantage for the display of any plurality of interrelated parameters not necessarily those associated with aircraft power plants. In any case, the invention provides for a bar graph in-line display of variations of normalized data from their respective nominal values whereby common high and low limit fiducial marks define the range of normalcy for all the displayed data.

It should be observed that the levelization and normalization of the displayed data reduces errors arising out of variations in the deflection sensitivity of the cathode ray tube. When the values of all the monitored parameters are equal to their respective nominal values, a continuous in-line display is produced at the center (nominal value line) of the cathode ray tube irrespective of the deflection sensitivity thereof. On the other hand, if the actual values of the monitored parameters (rather than their deviations from nominal values) were displayed, then the level of the individual data representing bars would vary with variations in deflection sensitivity of the cathode ray tube even in the event that the values of the displayed data were equal to their respective nominal values. Thus, the invention provides the additional feature of enhanced accuracy of the data display.

While the invention has been described in its preferred embodiments, it is understood that the words which has been used are words of description rather than of limitation and that changes within the purview of the appended claims may be made without departing from the true scope and spirit of the invention in its broader aspects.

What is claimed is:

1. A normalized data deviation indicator comprising means for generating a plurality of normalized data signals for representing respective varying data values, each said normalized data signal having the same magnitude of variation for representing a maximum acceptable deviation of the respective data value from its nominal value, means connected to the data signal generating means for sequentially sampling said normalized data signals, a signal comparator, means for producing a sequence of reference signals, each said reference signal occurring simultaneously with a respective sampled data signal and representing the nominal value of the respective data value, said signal comparator being connected to receive said sequence of reference signals and the sampled data signals, said signal comparator producing a sequence of output signals each representing the difference between a sampled data signal and its respective reference signal, a cathode ray tube having a pair of beam deflection means, means for applying said output signals to one of said deflection means, a sweep generator, means for synchronizing the operation of said sweep generator with the occurrence of said sequence of output signals, and means for coupling said sweep generator to the other of said deflection means.

2. A system performance monitor comprising a plurality of transducers for producing a plurality of data signals each representing a varying respective system parameter value, means connected to said transducers for normalizing said data signals, each said normalized data signal having the same magnitude of variation for representing a maximum acceptable deviation of the respective parameter value from its nominal value, means connected to receive the normalized data signals for sequentially sampling said normalized data signals, a signal comparator, means for producing a sequence of reference signals, each said reference signal occurring simultaneously with a respective sampled data signal and representing the nominal value of the respective parameter value, said signal comparator being connected to receive said sequence of reference signals and the sampled data signals, said signal comparator producing a sequence of output signals each representing the difference between a sampled data signal and its respective reference signal, a cathode ray tube having a pair of beam deflection means, means for applying said output signals to one of said deflection means, a sweep generator, means for synchronizing the operation of said sweep generator with the occurrence of said sequence of output signals, and means for coupling said sweep generator to the other of said deflection means.

3. A normalized data deviation indicator comprising means for generating a plurality of normalized data signals for representing respective varying data values, each said normalized data signal having the same magnitude of variation for representing a maximum acceptable deviation of the respective data value from its nominal value, means connected to the data signal generating means for selecting predetermined ones of said data signals, means connected to receive the selected data signals for sequentially sampling said selected data signals, a signal comparator, means for producing a sequence of reference signals, said reference signals occurring simultaneously with respective sampled data signals and representing the nominal values of said data values, said signal comparator being connected to receive said sequence of reference signals and the sampled data signals, said signal comparator producing a sequence of output signals each representing the difference between a sampled data signal and its respective reference signal, a cathode ray tube having a pair of beam deflection means, means for applying said output signals to one of said deflection means, a sweep generator, means for synchronizing the operation of said sweep generator with the occurrence of said sequence of output signals, and means for coupling said sweep generator to the other of said deflection means.

4. An indicator as defined in claim 3 wherein said means for applying said output signals to one of said deflection means includes a source of high frequency signals and a signal modulator, said output signals and said high frequency signals being applied to said modulator whereby said high frequency signals are modulated by said output signals, the modulated high frequency signals being applied to said one of said deflection means.

5. Appartaus for monitoring the power plant of a multiple engine vehicle, each engine having means for producing a plurality of normalized data signals representing the varying values of respective engine parameters, each said normalized data signal having the same magnitude of variation for representing the maximum acceptable deviation of the respective engine parameter value from its nominal value, means for selecting predetermined ones of said data signals, means connected to receive the selected data signals for sequentially sampling said selected data signals, means for producing a sequence of reference signals, said reference signals occurring simultaneously with respective sampled data signals and representing the nominal values of said engine parameters, a signal comparator, said signal comparator being connected to receive said sequence of reference signals and the sampled data signals, said signal comparator producing a sequence of output signals each representing the difference between a sampled data signal and its respective reference signal, a cathode ray tube having a pair of beam deflection means, means including signal modulating means for applying said output signals to one of said deflection means, a sweep generator, means for synchronizing the operation of said sweep generator with the occurrence of said sequence of output signals, and means for coupling said sweep generator to the other of said deflection means.

6. Apparatus for monitoring the power plant of a multiple engine vehicle, each engine having means for producing a plurality of normalized data signals representing the varying values of respective engine parameters, each said normalized data signal having the same magnitude of variation for representing the maximum acceptable deviation of the respective engine parameter value from its nominal value, first actuable means for selecting predetermined ones of said data signals, means connected to receive the selected data signals for sequentially sampling said selected data signals, means for producing a plurality of reference signals representing the nominal values of said engine parameters, second actuable means for selecting a predetermined one of said reference signals, means for simultaneously actuating said first and second actuable means, a signal comparator, said signal comparator being connected to receive the selected reference signal and the sampled data signals, said signal comparator producing a sequence of output signals each representing the difference between a sampled data signal and said selected reference signal, a cathode ray tube having a pair of beam deflection means, means for applying said output signals to one of said deflection means, a sweep generator, means for synchronizing the operation of said sweep generator with the occurrence of said sequence of output signal, and means for coupling said sweep generator to the other of said deflection means.

References Cited by the Examiner

UNITED STATES PATENTS

| | | | |
|---|---|---|---|
| 2,412,350 | 12/1946 | Morgan | 324—121 |
| 2,480,636 | 8/1949 | Dieke | 324—121 |
| 2,485,343 | 10/1949 | Zuschlag | 324—121 |
| 2,878,450 | 3/1959 | Rabier | 324—121 |

FOREIGN PATENTS 850,781   11/1960   Great Britain.

WALTER L. CARLSON, *Primary Examiner.*

FREDERICK M. STRADER, *Examiner.*

RUDOLPH V. ROLINEC, *Assistant Examiner.*